United States Patent Office 2,773,066
Patented Dec. 4, 1956

2,773,066

PROCESS FOR PRODUCING POLY-PYRIDYLS

Robert H. Linnell, Winston-Salem, N. C., and Antoine B. Zahlan, Syracuse, N. Y., assignors to Research Corporation, New York, N. Y., a corporation of New York No Drawing. Application November 19, 1953,
Serial No. 393,234

4 Claims. (Cl. 260—296)

This invention relates to a process of making polypyridyls. The invention is particularly useful in connection with the making of 2,2'-dipyridyl in satisfactory proportion to other polypyridyls and will therefore be illustrated particularly in connection with the making of this 2,2'-dipyridyl.

2,2'-dipyridyl is an activator or modifier of the driers for paint oils. Its use in driers for such oils is described in U. S. Patents 2,526,718 issued to Wheeler on October 24, 1950, and 2,565,897 issued to Wheeler on August 28, 1951. The 2,2'-dipyridyl has been, however, too expensive heretofore to justify such use.

The present invention provides a process of making the 2,2'-dipyridyl from pyridine with a yield that, while not large, provides the dipyridyl at a cost that makes possible its economic use according to the Wheeler patents or for other purposes including a complexing agent for metals.

Briefly stated, our invention comprises reacting dry pyridine or substitution products or analogs thereof with sodium metal or the like while maintaining the proportion of the said metal in unreacted condition but under reaction conditions in an extremely low ratio to the pyridine, oxidizing the product of the reaction, and then separating the resulting polypyridyls, including 2,2'-dipyridyl, from the oxidized material.

In one embodiment the invention comprises supplying additional amounts of the sodium and selected pyridine to the reaction mixture, to replace these materials as consumed in the reaction, the proportion of the additional sodium to the additional pyridine being above the proportion in the reaction mixture and being about 1 mole to 3 moles of the pyridine.

The process of manufacture, as applied to pyridine $C_5H_5N$ as the raw material, is in general as follows.

Dry pyridine is warmed in contact with metallic sodium, the finer the state of subdivision of the sodium the more rapidly the reaction with the pyridine occurs. The portion of the sodium metal in unreacted sodium is maintained in very low proportion to the mass of the pyridine. We obtain the best yield of the particularly desired 2,2'-dipyridyl when the proportion of the sodium metal in contact with pyridine at reaction temperature is not substantially above 0.01 mole of sodium for 1 mole of the pyridine.

Reaction occurs in which the sodium forms a compound with pyridine, it being understood that the union with sodium is through the nitrogen atoms of the pyridine.

To increase the rate of reaction, we warm the pyridine in contact with the sodium metal. We heat the composition to a temperature not above the boiling point, that is, under the prevailing pressure, as to the refluxing temperature of the mixture or at somewhat higher temperatures under pressure.

As materials are used up in this reaction, we supply additional sodium and pyridine, in the ratio of about 3 moles of the additional pyridine to 1 mole of the additional sodium. We make this addition continuously or substantially so and add the sodium and pyridine at about the rate at which they are consumed by reaction in the mix.

When the quantity of total materials added represents the appropriate size of final charge for the equipment in use, the further addition of sodium and pyridine is discontinued and the intermediate composition that results, including $Na(NC_5H_5)_3$, is then oxidized, to convert it to the desired 2,2'-dipyridyl and also other polypyridyls. These are then separated from each other and from sodium hydroxide and other by-products, if any.

The oxidation of the intermediate sodium tripyridine destroys this and like complexes present and removes 1 hydrogen from each of the pyridine rings so that two or more pyridyl groups unite with each other. Some of these pyridyl groups combine to form the 2,2'-dipyridyl, others form isomers of this dipyridyl and other form terpyridyls containing 3 of the pyridyl units in one molecule.

This oxidation also oxidizes the sodium and produces water from the hydrogens removed from the original pyridine units. The sodium oxide and water combine, so that the net effect of the oxidation is the formation of the di- and other polypyridyls and sodium hydroxide.

A convenient manner of separating the various polypyridyls from each other and also from the sodium hydroxide in the oxidized mixture involves first the distillation of unreacted pyridine from the mixture. This distillation is suitably made under atmospheric pressure, up to a vapor temperature of about 115–120°, the pyridine itself actually boiling at about 114.5°. There remains in the still the di- and other polypridyls, sodium hydroxide, and small amounts of other by-products.

The residue from the pyridine distillation is now treated with water in limited proportion adequate to dissolve the sodium hydroxide in the mixture to give a concentrated solution in which the polypyridyls have only slight solubility.

The polypyridyls are then separated from the resulting solution of sodium hydroxide as by extraction with a water immiscible, volatile solvent for the polypyridyls that is chemically inert under the conditions of use, that is, not chemically active with the polypyridyls, sodium hydroxide, or water.

The lighter solution of the polypyridyls so formed is then separated from the heavier aqueous sodium hydroxide solution, as by this difference in density of them without change of state of either of them, that is, by drawing off one solution from the other.

The separated organic solvent extract containing the polypyridyls is then subjected to distillation to remove the volatile solvent and then later to further distillation, suitably at very low pressure. In this way the dipyridyls are separated from terpyridyls. The two fractions (di- and ter-) so obtained may be used as such as difficultly volatile or substantially non-volatile heterocyclic amines, or as accelerators of polymerization of vinyl chloride with itself or with vinyl acetate and vinylidene compounds. Also, the two fractions may be redistilled, this time suitably with fractionation in vacuo, to separate the different isomers in the two fractions from each other. Also the reaction products can be used directly after neutralizing the sodium hydroxide.

Working in this manner, we have obtained such a ratio of the 2,2'-dipyridyl to other polypyridyls as to represent a yield of the 2,2'-dipyridyl in excess of 15% of the weight of pyridine consumed. We have obtained a substantially higher yield amounting in one case to 39%. (39 parts for 100 of pyridine consumed) when the proportion of the sodium metal in contact with pyridine at reaction temperature was maintained at all times in proportion not above 0.004 mole for 1 mole of the pyridine.

The principle on which the invention works is considered to be the activation of the 2,2'-position of the pyridine units by the low proportion of sodium used and the union of the pyridyl groups to the extent shown at the activated positions during the oxidation process.

While pyridine $C_5H_5N$ is the material used in making 2,2'-dipyridyl, we use other pyridines to make homologs and analogs. Thus we use the alpha, beta and gamma picoline, in which a 2 position (next to the N) is unsubstituted, and like $C_1$–$C_4$ alkyl substituted pyridine in addition to the picolines. These other substituted pyridines that we may use include any dimethyl pyridine, diisopropyl pyridine, and dibutyl pyridine.

As the extracting solvent for separating the oxidized products from the sodium hydroxide solution, benzene, toluene, and xylene are preferred, benzene being the one we ordinarily use. Petroleum fractions of like boiling ranges may be used, but are not as satisfactory because of lower solubility for polypyridyls.

As the oxidizing material for liberating the polypyridyls from the intermediate products of reaction of the pyridines with sodium metal, we use an oxygen containing gas. Air is satisfactory. There is no need of a more concentrated form of oxygen, although that is permissible and the time is shortened somewhat when undiluted oxygen is used.

Elevated temperatures increase the speed of the reaction and for that reason we operate ordinarily at temperatures above 90° C. and suitably at the reflux temperature of around 115°. Working under pressure and higher temperatures, as at 140°–200° C., increases the speed of the reaction and the proportion of 2,2'-dipyridyl formed to other polypyridyls.

Elevated temperatures of oxidation increase also the speed of oxidation of the sodium pyridine complex. At this stage, however, the rate of introduction of the oxygen is so controlled or the temperature rise so moderated by cooling if necessary, that unreacted pyridine is not boiled away.

As to analyses, the 2,2'-dipyridyl is determined colorimetrically by the intensity of color developed in the dipyridyl fraction with ferrous iron. This test, more specifically is as follows: Acetic acid buffered by sodium acetate to pH 4.5 is added to ferrous iron, as in a ferrous sulfate solution, the amount of the ferrous iron being in slight excess of the expected requirement for the 2,2'-dipyridyl estimated to be present, the equivalent of iron being calculated on the basis of 1 iron for 2 moles of the dipyridyl. Then the maximum adsorption at 510 millimicrons wave length of light in a Beckmann spectophotometer is compared with that of a standard solution of the 2,2'-dipyridyl of known concentration. The concentration of the unknown is calculated from this comparison.

A polarographic method was developed for determining the dipyridyls, the 4,4'-dipyridyl being determined separately, 2,3'- and 2,4'-dipyridyls jointly, and 3,3'-dipyridyl being obtained by difference when these results are combined with other analytical methods developed for the purpose. The readings in each case are compared with calibration curves for each of the dipyridyls of known concentration.

2,2',2''-terpyridyl was identified in the terpyridyl fraction. The 2,2',2''-terpyridyl was determined colorimetrically by a method identical with that for the 2,2'-dipyridyl except that the maximum adsorption for the compound occurs at wave length 540 millimicrons.

Other terpyridyls which complex with iron were also found in our oxidation product.

The invention will be further illustrated by description in connection with the following specific examples of the practice of it, proportions here and elsewhere herein being expressed as parts by weight unless otherwise stated to the contrary.

*Example 1*

Pyridine is dried over night with potassium hydroxide pellets and then poured off from the resulting moist granules. The thus dried pyridine is then distilled and the fraction distilling at about 114°–115° C. is accepted.

Of this dried and distilled pyridine, 790 parts (10 moles) are contacted with 2.3 parts (0.1 mole) of sodium in the form of short lengths of fine wire. The mixture is refluxed at 115° C. for about 10 hours.

Then air is passed through the solution at about 90° C. When the color of the mixture has changed from greenish blue to brown, the oxidation is discontinued. At this stage there is no further retention of oxygen.

The unreacted pyridine is now removed by distillation at atmospheric pressure, up to about 115° C. vapor temperature. When all the pyridine has been thus removed, the distillation is stopped.

About 10 parts of water are now added to dissolve the sodium hydroxide produced.

The products are then extracted with benzene in several portions until the aqueous layer is practically free from polypyridyls. The combined benzene extract may be dried over potassium hydroxide pellets. The benzene is removed from the solution by distillation.

The oil is now vacuum distilled under a pressure of about 4 mm. of mercury. The dipyridyls distil in the range 70°–140° C. The end of the distillation is usually determined by a negative test for the 4,4'-dipyridyl which has the highest boiling point of the 6 possible dipyridyls, the 4,4'-dipyridyl with zinc and acetic acid giving a blue color. The second fraction consists of the terpyridyls. These distil usually between 200° and 250° C. at about 4 mm. of mercury. By the process of this example, we have found a yield of 2,2'-dipyridyl amounting to 16% of the weight of the pyridine reacted. The total dipyridyls amounted to 45% and the total terpyridyls amounted to about 30%.

*Example 2*

The procedure of Example 1 is followed except that the proportion of the sodium metal is kept at all times at a lower level not above 0.004 mole of sodium for 1 mole of the pyridine under reaction conditions. With such decreased ratio of sodium, we have obtained a yield of 2,2'-dipyridyl equal to 39% of the pyridine which disappears in the reaction.

*Example 3*

The procedure of either Example 1 or 2 is followed except that refluxing as the temperature of reaction for 10 hours is replaced by heating in an autoclave at about 200° C. for 2 hours.

*Example 4*

The procedure of Example 1, 2, or 3 is followed with the exception that there is substituted, for the pyridine, an equi-molecular proportion of any one of the other pyridines or substituted products or analogs named above.

In this substitution the boiling ranges are changed and also the color of the intermediate reaction mixture and of the products varies somewhat. Otherwise the procedures are the same and we arrive at the end with isomers or analogs containing the same substituents in the polypyridyl molecule that appeared in the original selected pyridine.

*Example 5*

The procedure of Example 1, 2, or 4 is followed except that the process is made continuous over a sufficient period of time to utilize properly the capacity of the reaction vessel.

When the selected pyridine and the very small proportion of sodium first brought into contact have largely reacted, then additional sodium metal and pyridine are introduced at the same time, the additional sodium and pyridine being introduced separately and in the ratio of approximately 1 mole of sodium to 3 moles of pyridine and the rate of introduction being substantially that at which the two react under the prevailing conditions, so that the ratio of unreacted sodium to pyridine in the reaction vessel is maintained at all times at the necessary very low level.

In this continuous process we use to advantage a relatively high temperature so that the additional sodium and pyridine react rapidly after being introduced and for the same reason also use to advantage the sodium in finely divided form as in the form of a colloidal dispersion of sodium in xylene or like dispersing medium.

While the elevated temperatures may be varied within limits, a recommended temperature for the continuous process is one within the range 115°–200° C., pressure being applied if necessary to prevent boiling away pyridine when the temperature used is above the boiling point of pyridine at atmospheric pressure.

*Example 6*

The procedure in Example 5 is followed except that the air-oxidation of the sodium pyridine intermediate compound is effected prior to subsequent addition of fresh sodium and pyridine. In other words, the process of this example involves alternate oxidation of the sodium-pyridine intermediate and introduction of additional pyridine and sodium metal.

*Example 7*

The procedure of Examples 1–6 is followed with the exception that undesired polypyridyls from a previous run are present in the charge at the start of a new run, so that the relative mass of them at all times is large.

An illustration of the procedure of this example follows.

Sodium metal and pyridine are reacted at elevated temperature, as at 90°–200° C. in a charge which, at the reaction temperature, never contains more than 0.01 mole of unreacted sodium to 1 mole of unreacted pyridine. The intermediate so formed is oxidized by air to polypyridyls. The oxidized material is then distilled, first to remove remaining pyridine and then in vacuo to a vapor temperature moderately above the boiling point of 2,2′-dipyridyl (or other desired polypyridyl). Then the distillation is discontinued, the batch cooled to the reaction temperature, fresh sodium and pyridine introduced, and the cycle repeated.

The purpose of retaining the undesired by-products in the subsequent reaction is to decrease the proportion of them formed in the new batch.

The process described is simple and effective and gives good yields of the desired polypyridyls and particularly of the 2,2′-dipyridyl.

It will be understood that it is intended to cover all changes and modifications of the examples of the invention herein chosen for the purpose of illustration which do not constitute departures from the spirit and scope of the invention.

What we claim:

1. In making polypyridyls, the process which comprises bringing sodium metal into contact with a dry pyridine in which a 2 position is unsubstituted, selected from the group consisting of pyridine and $C_1$–$C_4$ alkyl substituted pyridines, maintaining the proportion of sodium metal in unreacted condition in contact with the selected pyridine under reaction conditions at all times at a level not above about 0.01 mole for 1 mole of the selected pyridine, warming the sodium and selected pyridine until reaction between them is substantially complete, oxidizing the thus reacted mixture, this oxidation producing polypyridyls and sodium hydroxide and leaving an unreacted pyridine, and then separating the polypyridyls from the said pyridine and sodium hydroxide.

2. In making 2,2′-dipyridyl, the process which comprises contacting sodium metal with dry pyridine $C_5H_5N$ in the proportion of not more than about 0.01 mole of the sodium metal to 1 mole of the pyridine, warming the sodium and pyridine until reaction between them is substantially complete, oxidizing the thus reacted mixture by passing an oxygen containing gas therethrough until substantially no more oxygen is retained in the mixture, this oxidation producing polypyridyls including 2,2′-dipyridyl, other dipyridyls, and 2,2′,2″-terpyridyl and sodium hydroxide and leaving some unreacted pyridine, and then separating the 2,2′-dipyridyl from the other polypyridyls, pyridine and sodium hydroxide.

3. The process of claim 2 in which the said separating of the polypyridyls from the remaining pyridine is effected by distilling the oxidized mixture up to a vapor temperature of about 115° C., this distillation removing unreacted pyridine, adding water in amount to dissolve all sodium hydroxide present to the form of a concentrated solution having only low solvent power for the polypyridyls, then extracting the polypyridyls from the said solution and other products, if any present, by mixing with a water immiscible, volatile, chemically inert solvent for the polypyridyls, separating the resulting extract of the polypyridyls in the said solvent from the sodium hydroxide solution, distilling the solvent from the extract, and then vacuum distilling the remaining polypyridyls.

4. The process of claim 1 which includes effecting the reaction of the sodium metal and selected pyridine in contact with undesired by-products from a previous reaction of sodium with the selected pyridine.

References Cited in the file of this patent

Smith: J. Am. Chem. Soc., 46:414–419 (1924).